US009626620B2

(12) United States Patent
McDowell

(10) Patent No.: US 9,626,620 B2
(45) Date of Patent: Apr. 18, 2017

(54) FRANGIBLE RFID TAG AND METHOD OF PRODUCING SAME

(71) Applicant: Haemonetics Corporation, Braintree, MA (US)

(72) Inventor: Christopher S. McDowell, Murray, UT (US)

(73) Assignee: Haemonetics Corporation, Braintree, MA (US)

( * ) Notice: Subject to any disclaimer, the term of this patent is extended or adjusted under 35 U.S.C. 154(b) by 0 days.

(21) Appl. No.: 14/894,235

(22) PCT Filed: Jun. 4, 2014

(86) PCT No.: PCT/US2014/040879
§ 371 (c)(1),
(2) Date: Nov. 25, 2015

(87) PCT Pub. No.: WO2014/197573
PCT Pub. Date: Dec. 11, 2014

(65) Prior Publication Data
US 2016/0101019 A1     Apr. 14, 2016

Related U.S. Application Data

(60) Provisional application No. 61/831,262, filed on Jun. 5, 2013.

(51) Int. Cl.
G06K 19/077 (2006.01)
G06K 19/07 (2006.01)
G06K 17/00 (2006.01)

(52) U.S. Cl.
CPC ... G06K 19/07798 (2013.01); G06K 19/0723 (2013.01); G06K 19/0776 (2013.01); G06K 19/07726 (2013.01); G06K 2017/009 (2013.01)

(58) Field of Classification Search
CPC ....... G06K 19/07726; G06K 19/07798; G06K 19/0776; G08B 13/2437
(Continued)

(56) References Cited

U.S. PATENT DOCUMENTS 5,444,223 A   8/1995  Blama ........................ 235/435
5,777,561 A   7/1998  Chieu et al. ............. 340/825.54
(Continued)

FOREIGN PATENT DOCUMENTS

DE   EP 2050580 A2 *  4/2009  ............... B42D 3/12
EP       1 286 775 B1     7/2006  ............... B01L 3/00
(Continued)

OTHER PUBLICATIONS

JP 2009129291 English equivalent translation, European Patent Office website, retrieved May 15, 2016, http://worldwide.espacenet.com/publicationDetails/biblio?DB=EPODOC&II=0&ND=3&adjacent=true&locale=en_EP&FT=D&date=20090611&CC=JP&NR=2009129291A&KC=A.*
(Continued)

Primary Examiner — Suezu Ellis
(74) Attorney, Agent, or Firm — Sunstein Kann Murphy & Timbers LLP

(57) ABSTRACT

A frangible RFID tag includes a substrate having at least one weakened area, an RFID chip and an antenna. The RFID chip and the antenna are located on the substrate and the antenna is electrically connected to the RFID chip. The RFID tag also includes a plurality of adhesive areas applied to the underside of the substrate. The adhesive areas allow the RFID tag to be secured to an object. The adhesive areas may be spaced from one another to form at least one gap between the adhesive areas. The gap(s) may be located under the at least one weakened area.

44 Claims, 11 Drawing Sheets

(58) Field of Classification Search
USPC .................. 235/487, 488, 492; 340/572.1
See application file for complete search history.

(56) References Cited

U.S. PATENT DOCUMENTS

| | | | |
|---|---|---|---|
| 5,874,214 A | 2/1999 | Nova et al. .................. 435/6 |
| 5,883,582 A | 3/1999 | Bowers et al. .......... 340/825.54 |
| 5,898,370 A * | 4/1999 | Reymond ............ G06K 19/073 |
| | | | 340/539.1 |
| 6,045,652 A | 4/2000 | Tuttle et al. ................. 156/292 |
| 6,147,604 A * | 11/2000 | Wiklof ............ G06K 19/07749 |
| | | | 235/487 |
| 6,281,795 B1 | 8/2001 | Smith et al. ............... 340/572.1 |
| 6,441,741 B1 | 8/2002 | Yoakum ..................... 340/572.8 |
| 6,478,229 B1 | 11/2002 | Epstein ........................ 235/492 |
| 6,483,434 B1 | 11/2002 | UmiKer .................... 340/572.1 |
| 6,520,544 B1 | 2/2003 | Mitchell et al. ............... 283/70 |
| 6,592,043 B1 | 7/2003 | Britton ......................... 235/492 |
| 6,778,089 B2 | 8/2004 | Yoakum ..................... 340/572.8 |
| 6,794,000 B2 * | 9/2004 | Adams ................. G06K 19/073 |
| | | | 340/572.1 |
| 6,940,408 B2 | 9/2005 | Ferguson et al. .......... 340/572.7 |
| 6,951,596 B2 | 10/2005 | Green et al. .................. 156/264 |
| 7,061,831 B2 | 6/2006 | De La Huerga ............... 368/10 |
| 7,070,053 B1 | 7/2006 | Abrams et al. .............. 206/459.5 |
| 7,091,864 B2 | 8/2006 | Veitch et al. .............. 340/572.8 |
| 7,102,522 B2 | 9/2006 | Kuhns ....................... 340/572.7 |
| 7,116,240 B2 | 10/2006 | Hyde .......................... 340/661 |
| 7,210,635 B2 | 5/2007 | Amstutz et al. .............. 235/492 |
| 7,212,127 B2 | 5/2007 | Jacober et al. ............ 340/572.8 |
| 7,215,251 B2 | 5/2007 | Hyde .......................... 340/661 |
| 7,224,280 B2 | 5/2007 | Ferguson et al. .......... 340/572.7 |
| 7,271,726 B2 | 9/2007 | Hollon ....................... 340/572.7 |
| 7,275,682 B2 | 10/2007 | Excoffier et al. ............. 235/375 |
| 7,350,703 B2 | 4/2008 | Ambartsoumian .......... 235/385 |
| 7,361,251 B2 | 4/2008 | Green et al. .................. 156/264 |
| 7,368,032 B2 | 5/2008 | Green et al. .................. 156/264 |
| 7,388,506 B2 | 6/2008 | Abbott ....................... 340/572.8 |
| 7,394,383 B2 | 7/2008 | Hager et al. ............... 340/572.8 |
| 7,477,150 B2 | 1/2009 | Renzetti et al. ............ 340/572.1 |
| 7,479,887 B2 | 1/2009 | Meyer ....................... 340/572.8 |
| 7,479,888 B2 | 1/2009 | Jacober et al. ............ 340/572.8 |
| 7,490,766 B2 | 2/2009 | Auchinleck .................. 235/385 |
| 7,490,767 B2 | 2/2009 | Auchinleck .................. 235/385 |
| 7,501,947 B2 | 3/2009 | Youn ......................... 340/572.1 |
| 7,528,727 B2 | 5/2009 | Morrow ..................... 340/572.8 |
| 7,538,678 B2 | 5/2009 | Jung et al. ................. 340/572.1 |
| 7,541,931 B1 | 6/2009 | Freed et al. ................ 340/572.1 |
| 7,586,417 B2 | 9/2009 | Chisholm .................. 340/572.8 |
| 7,608,457 B2 | 10/2009 | Hunsley ....................... 436/70 |
| 7,609,166 B2 | 10/2009 | Forster et al. .............. 340/572.8 |
| 7,637,733 B2 | 12/2009 | O'Connell et al. ............ 425/392 |
| 7,649,463 B2 | 1/2010 | Tuttle ....................... 340/572.1 |
| 7,705,734 B2 | 4/2010 | Martinelli .................. 340/572.8 |
| 7,713,232 B2 | 5/2010 | Uber, III et al. .......... 604/93.01 |
| 7,755,484 B2 | 7/2010 | Cullen et al. .............. 340/572.1 |
| 7,755,488 B2 | 7/2010 | Dvorsky .................... 340/572.1 |
| 7,772,981 B1 | 8/2010 | Lambert et al. ........... 340/572.8 |
| 7,777,628 B2 | 8/2010 | Tilson, Jr. ................ 340/572.1 |
| 7,782,213 B2 | 8/2010 | Ohashi ..................... 340/572.8 |
| 7,794,141 B2 | 9/2010 | Perry et al. .................... 374/44 |
| 7,804,405 B2 | 9/2010 | Norman et al. ............ 340/572.1 |
| 7,829,741 B2 | 11/2010 | Fukuhara et al. ............. 564/412 |
| 7,850,893 B2 | 12/2010 | Chisholm et al. ........ 264/272.11 |
| 7,859,416 B2 | 12/2010 | Tuttle ....................... 340/572.8 |
| 7,875,227 B2 | 1/2011 | Chisholm ................ 264/272.15 |
| 7,892,471 B2 | 2/2011 | Burke et al. ................. 264/241 |
| 7,922,961 B2 | 4/2011 | Chisholm et al. ............ 264/516 |
| 7,973,664 B1 | 7/2011 | Lambert et al. ........... 340/572.8 |
| 7,978,079 B2 | 7/2011 | Geissler et al. ........... 340/572.8 |
| 8,009,047 B2 | 8/2011 | Kanda et al. .............. 340/572.1 |
| 8,035,518 B2 | 10/2011 | Kolton et al. ............. 340/572.1 |
| 8,049,627 B1 | 11/2011 | Addante .................... 340/572.8 |
| 8,063,741 B2 | 11/2011 | Hioki et al. ................. 340/10.1 |
| 8,068,028 B2 | 11/2011 | Phaneuf .................... 340/572.1 |
| 8,072,333 B2 | 12/2011 | Ferguson et al. .......... 340/572.7 |
| 8,089,359 B2 | 1/2012 | Lopez et al. ............... 340/572.1 |
| 8,094,027 B2 | 1/2012 | Yang ......................... 340/572.8 |
| 8,097,199 B2 | 1/2012 | Abbott et al. ............ 264/272.15 |
| 8,098,162 B2 | 1/2012 | Abbott et al. ............. 340/572.8 |
| 8,100,585 B2 | 1/2012 | Burke et al. ...................... 383/5 |
| 8,105,487 B2 | 1/2012 | Fulkerson et al. ........ 210/321.71 |
| 8,113,007 B2 | 2/2012 | Zenobi et al. ................... 62/62 |
| 8,115,636 B2 | 2/2012 | Forster ...................... 340/572.3 |
| 8,120,484 B2 | 2/2012 | Chisholm .................. 340/572.1 |
| 8,120,485 B2 | 2/2012 | Yang ......................... 340/572.1 |
| 8,136,735 B2 | 3/2012 | Arai et al. .................... 235/492 |
| 8,161,910 B2 | 4/2012 | Coiro, Sr. et al. ............ 119/417 |
| 8,164,457 B2 | 4/2012 | Dunlap et al. ............. 340/572.1 |
| 8,173,057 B2 | 5/2012 | Parker et al. ................. 264/318 |
| 8,183,052 B2 | 5/2012 | Reed et al. .................... 436/172 |
| 8,212,226 B2 | 7/2012 | Chisholm .................. 250/461.1 |
| 8,212,676 B2 | 7/2012 | Cullen et al. .............. 340/572.1 |
| 8,215,518 B2 | 7/2012 | Hyde et al. ............... 220/592.26 |
| 8,215,835 B2 | 7/2012 | Hyde et al. .................. 374/208 |
| 8,231,024 B2 | 7/2012 | Sanfilippo et al. ................ 220/6 |
| 8,242,907 B2 | 8/2012 | Butler et al. ............... 340/572.1 |
| 8,242,908 B2 | 8/2012 | Moore et al. .............. 340/572.1 |
| 8,242,911 B2 | 8/2012 | Moore et al. .............. 340/572.1 |
| 8,246,773 B2 | 8/2012 | Green et al. .................. 156/265 |
| 8,248,238 B2 | 8/2012 | Butler et al. ............... 340/572.1 |
| 8,248,239 B2 | 8/2012 | Butler et al. ............... 340/572.1 |
| 8,253,567 B2 | 8/2012 | Butler et al. ............... 340/572.1 |
| 8,257,636 B2 | 9/2012 | Oconnell et al. ............. 264/339 |
| 8,267,308 B2 | 9/2012 | Devergne et al. ............ 235/375 |
| 8,267,325 B2 | 9/2012 | Phaneuf ..................... 235/492 |
| 8,269,630 B2 | 9/2012 | Butler et al. ............... 340/572.1 |
| 8,269,670 B2 | 9/2012 | Sprowl et al. .......... 343/700 MS |
| 8,279,065 B2 | 10/2012 | Butler et al. ............... 340/572.1 |
| 8,284,055 B2 | 10/2012 | Butler et al. ............... 340/572.1 |
| 8,292,173 B2 | 10/2012 | Yturralde et al. ............. 235/385 |
| 8,292,594 B2 | 10/2012 | Tracey et al. ................... 417/43 |
| 8,294,579 B2 | 10/2012 | Butler et al. ............... 340/572.1 |
| 8,313,594 B2 | 11/2012 | Muirhead ...................... 156/64 |
| 8,317,099 B2 | 11/2012 | Perkins et al. ................ 235/385 |
| 8,318,499 B2 | 11/2012 | Fritchie et al. ................. 436/43 |
| 8,325,047 B2 | 12/2012 | Marur et al. .............. 340/572.8 |
| 8,330,602 B2 | 12/2012 | Ohashi et al. ............. 340/572.8 |
| 8,427,316 B2 | 4/2013 | Bielas ........................ 340/572.1 |
| 8,432,286 B2 | 4/2013 | Kolton et al. ............. 340/572.9 |
| 8,466,793 B2 | 6/2013 | Kolton et al. ............. 340/572.8 |
| 8,758,321 B2 | 6/2014 | Stacey et al. ................. 604/403 |
| 2002/0135481 A1 * | 9/2002 | Conwell ............. G06K 19/073 |
| | | | 340/572.1 |
| 2005/0019943 A1 | 1/2005 | Chaoui et al. ................. 436/165 |
| 2007/0139202 A1 | 6/2007 | Austin ...................... 340/572.8 |
| 2008/0036677 A1 * | 2/2008 | Matsushita ...... G06K 19/07749 |
| | | | 343/866 |
| 2008/0117058 A1 | 5/2008 | Oberle ...................... 340/572.8 |
| 2008/0213135 A1 | 9/2008 | Burke et al. .................. 422/102 |
| 2008/0309497 A1 | 12/2008 | Bryant ...................... 340/572.8 |
| 2009/0303044 A1 * | 12/2009 | Furuichi .......... G06K 19/07798 |
| | | | 340/568.1 |
| 2010/0007501 A1 | 1/2010 | Yang et al. ................ 340/572.8 |
| 2010/0102967 A1 | 4/2010 | Lee et al. ................... 340/572.8 |
| 2010/0181382 A1 | 7/2010 | Speich ......................... 235/492 |
| 2010/0253524 A1 | 10/2010 | Kolton et al. ............. 340/572.9 |
| 2011/0031178 A1 | 2/2011 | Burke et al. ................. 210/251 |
| 2011/0281346 A1 * | 11/2011 | Halpern .................. A61M 1/02 |
| | | | 435/307.1 |
| 2012/0217307 A1 | 8/2012 | Martin et al. ................. 235/494 |

FOREIGN PATENT DOCUMENTS

| | | | |
|---|---|---|---|
| EP | 2 050 580 A2 | 4/2009 | ............ B42D 3/12 |
| EP | 1 946 250 B1 | 7/2010 | ............ G06K 19/04 |
| JP | 2009129291 A * | 6/2009 | |
| JP | 2010128516 A * | 6/2010 | |

OTHER PUBLICATIONS

JP 2010128516 English equivalent translation, European Patent Office website, retrieved May 15, 2016, http://worldwide.espacenet.

(56) References Cited

OTHER PUBLICATIONS com/publicationDetails/biblio?DB=EPODOC&II=0&ND=3& adjacent=true&locale=en_EP&FT=D&date=20100610&CC=JP& NR=2010128516A&KC=A.*

EP 2050580 English equivalent translation, European Patent Office website, retrieved May 15, 2016, http://worldwide.espacenet.com/publicationDetails/biblio?CC=EP&NR=2050580A2&KC=A2& hFT=D&ND=3&date=20090422&DB=EPODOC&locale=en_EP.*

Blaine R. Copenheaver, Authorized officer, International Search Report—Application No. PCT/US2014/040879, mailed Nov. 4, 2014, together with the Written Opinion of the International Searching Authority, 10 pages.

Philippe Bécamel, Authorized officer The International Bureau of WIPO, International Preliminary Report on Patentability—Application No. PCT/US2014/040879, mailed Dec. 8, 2015, 9 pages.

* cited by examiner

FRANGIBLE RFID TAG AND METHOD OF PRODUCING SAME

PRIORITY

This patent application claims priority from U.S. patent application No. 61/831,262, filed Jun. 5, 2013, entitled, "Frangible RFID Tag," and naming Christopher S. McDowell as inventor, the disclosure of which is incorporated herein, in its entirety, by reference.

TECHNICAL FIELD

The present invention relates to radio-frequency identification tags, and more particularly to tamper-evident and tamper-resistant radio-frequency tags that may be secured to an object.

BACKGROUND ART

Radio frequency identification (RFID) tags are commonly used to monitor and track a variety of goods. In particular, RFID tags may be secured to and/or formed directly within (e.g., molded within) an object or a storage container. These RFID tags are then programmed with information relating to the object and/or the substance contained within the storage container. The RFID tags may then be scanned during storage and/or transport to obtain the product details.

For valuable products/objects, some individuals may have an incentive to tamper with and/or switch the RFID tag with an RFID tag from another object/container. For example, in the context of blood products, if one bottle of blood product is marked as HIV+ (and therefore is unusable), and another container of acceptable blood product breaks, an individual may be tempted to switch the RFID tag of the broken bottle of blood product with the RFID tag on the bottle marked as HIV+. As one would expect, this would create a significant health risk to a patient receiving the HIV+ blood product.

SUMMARY OF THE EMBODIMENTS

In a first embodiment of the invention, there is provided a frangible RFID tag having a substrate with at least one weakened area, and an RFID chip and antenna located on the substrate. The antenna may be electrically connected to the RFID chip. The RFID tag may also include a plurality of adhesive areas applied to an underside of the substrate and configured to allow the RFID tag to be secured to an object. The plurality of adhesive areas may be spaced from one another to form at least one gap between the plurality of adhesive areas. The at least one gap may be located under the at least one weakened area.

Additionally, the frangible RFID tag may also include a first release liner, an adhesive layer located above the substrate, and a top layer secured to the substrate via the adhesive layer. The first release liner may be located below the plurality of adhesive areas and may be configured to be removed from the plurality of adhesive areas prior to securing the RFID tag to the object. The top layer may cover the antenna and RFID chip, may be opaque, and/or may be a thin polymer layer. The top layer may protect the RFID chip from dust and moisture.

In some embodiments, the plurality of adhesive areas may be areas of high bond adhesive, and the weakened areas may be cuts formed within the substrate. For example, the weakened areas may be die-cuts. The antenna may include a loop, and at least one of the weakened areas may be within the loop and/or extend below the antenna. The weakened areas may be configured to cause destruction of the RFID tag (e.g., tearing of the antenna) upon removal of the RFID tag from the object.

In accordance with further embodiments, a blood component storage container may include a body defining an interior volume for storing a blood component, and a frangible RFID tag secured to a surface of the storage container. The RFID tag may include a substrate having at least one weakened area, an RFID chip located on the substrate, an antenna located on the substrate and electrically connected to the RFID chip, and a plurality of adhesive areas (e.g., areas of high bond adhesive). The plurality of adhesive areas may be applied to the underside of the substrate and may be configured to allow the RFID tag to be secured to the blood component storage container. The adhesive areas may be spaced from one another to form at least one gap between the adhesive areas. The gap(s) may be located under the weakened area(s).

The frangible RFID tag may also include a first release liner that is located below the plurality of adhesive areas. The first release liner may be removed from the adhesive areas prior to securing the RFID tag to the blood storage container. The tag may also include an adhesive layer located above the substrate, and a top layer secured to the substrate via the second adhesive layer. The top layer may cover the antenna and RFID chip, and may be opaque. Additionally or alternatively, the top layer may be a thin polymer layer and may protect the RFID chip from dust and moisture.

The weakened areas may be cuts (e.g., die-cuts) formed within the substrate, and may extend below the antenna. The antenna may include a loop, and one of the weakened areas may be within the loop. Destruction of the RFID tag may include tearing of the antenna.

In accordance with additional embodiments, a method of producing a frangible RFIG tag includes (1) providing a device layer having a substrate with an antenna and an RFID chip located on the substrate, (2) forming at least one weakened area within the substrate, and (3) applying a plurality of adhesive areas (e.g., areas of high bond adhesive) to an underside of the substrate. The plurality of adhesive areas may be configured to allow the RFID tag to be secured to an object and may be spaced from one another to form at least one gap between the adhesive areas. The gap(s) may be located under the weakened area(s).

In some embodiments, the method may also include (1) applying a first release liner to the plurality of adhesive areas, and (2) applying a top layer to a top surface of the device layer. The first release liner may be configured to be removed from the plurality of adhesive areas prior to securing the RFID tag to the object. The top layer may cover the antenna and RFID chip, and may include an adhesive layer that secures the top layer to the device layer. The top layer may be opaque and/or a thin polymer layer.

In further embodiments, forming the weakened area(s) within the substrate may include cutting and/or die-cutting the substrate. The antenna may include a loop and one of the weakened areas may be located within the loop. Additionally or alternatively, the weakened areas may extend below the antenna. The weakened areas may be configured to cause destruction of the RFID tag (e.g., tearing of the antenna) upon removal of the RFID tag from the object.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

In illustrative embodiments, a radio-frequency identification (RFID) tag may have a substrate with weakened areas that act as tear initiation sites when a tensile load is applied to the RFID tag. In this manner, various embodiments of the present invention exhibit tamper-proof and/or tamper-evident characteristics upon attempted removal of the RFID tag from an object to which it is secured. Furthermore, various embodiments of the present invention also prevent an individual from removing an RFID tag from one object and placing it on another object or otherwise switching the RFID tags of multiple objects.

Figure 1:
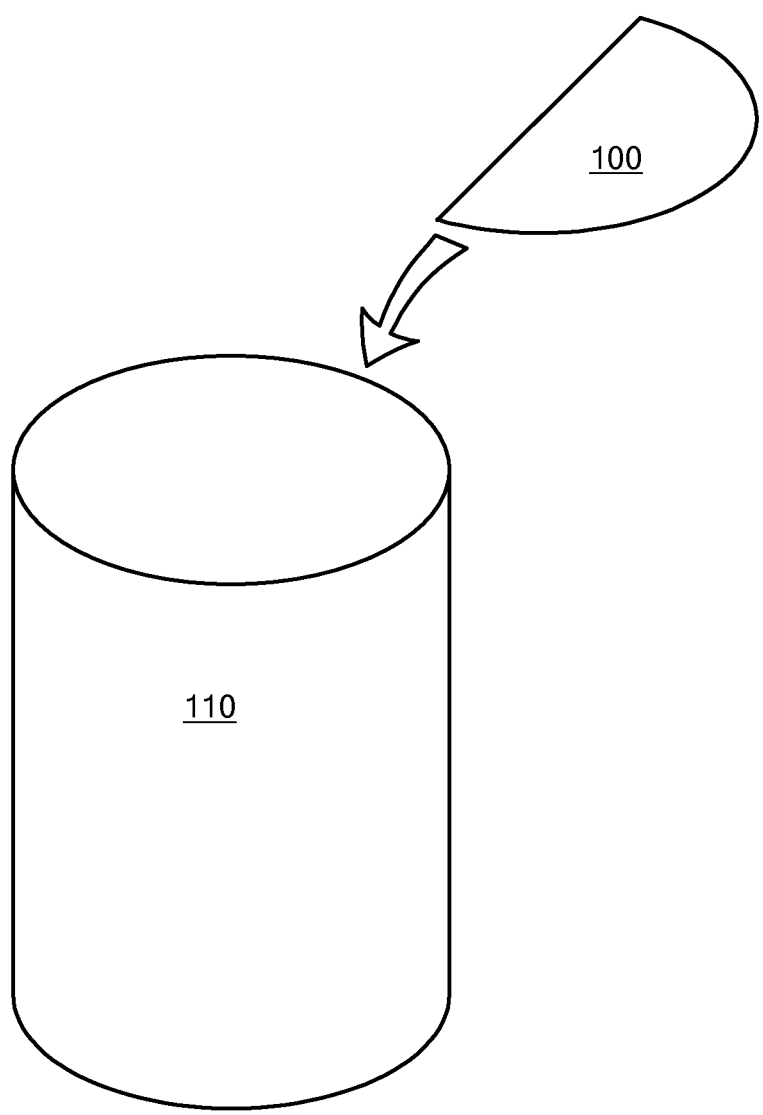
FIG. 1 schematically shows an RFID tag in accordance with various embodiments of the present invention.

FIG. 1 schematically shows an RFID tag 100 in accordance with some embodiments of the present invention. As discussed in greater detail below, the RFID tag 100 may consist of a number of layers, including an adhesive layer that allows the RFID tag 100 to be secured to an object 110. In this manner, the RFID tag 100 may be used to track and monitor any number of objects once secured to the object.

As mentioned above and as shown in FIG. 2, the RFID tag 100 may consist of a number of layers. For example, the RFID tag 100 may include a main, device layer 120 having a substrate 125 upon which the RFID chip 130 and antenna 140 (e.g., a copper trace antenna) may be located. Although any number of materials may be used for the substrate 125, in some embodiments, the substrate may be a polyethylene terephthalate (PETG) film. In order to facilitate the destruction of the RFID tag 100 during attempted removal from the object 110, the substrate 125 can have one or more weakened areas 150 that act as tear initiation points during removal.

The weakened areas 150 may be cuts, perforations, or similar structures within the substrate 125 that weaken the substrate 125 in the area of the cut/perforation. In this manner, when a tensile force is applied to the RFID tag 100 (e.g., during removal from the object), the tensile load will cause the substrate 125 to tear at the weakened area(s) 150. As discussed in greater detail below, this tearing, in turn, may propagate across the antenna 140 and/or RFID chip 130, thereby destroying the RFID tag 100.

Figure 3A:
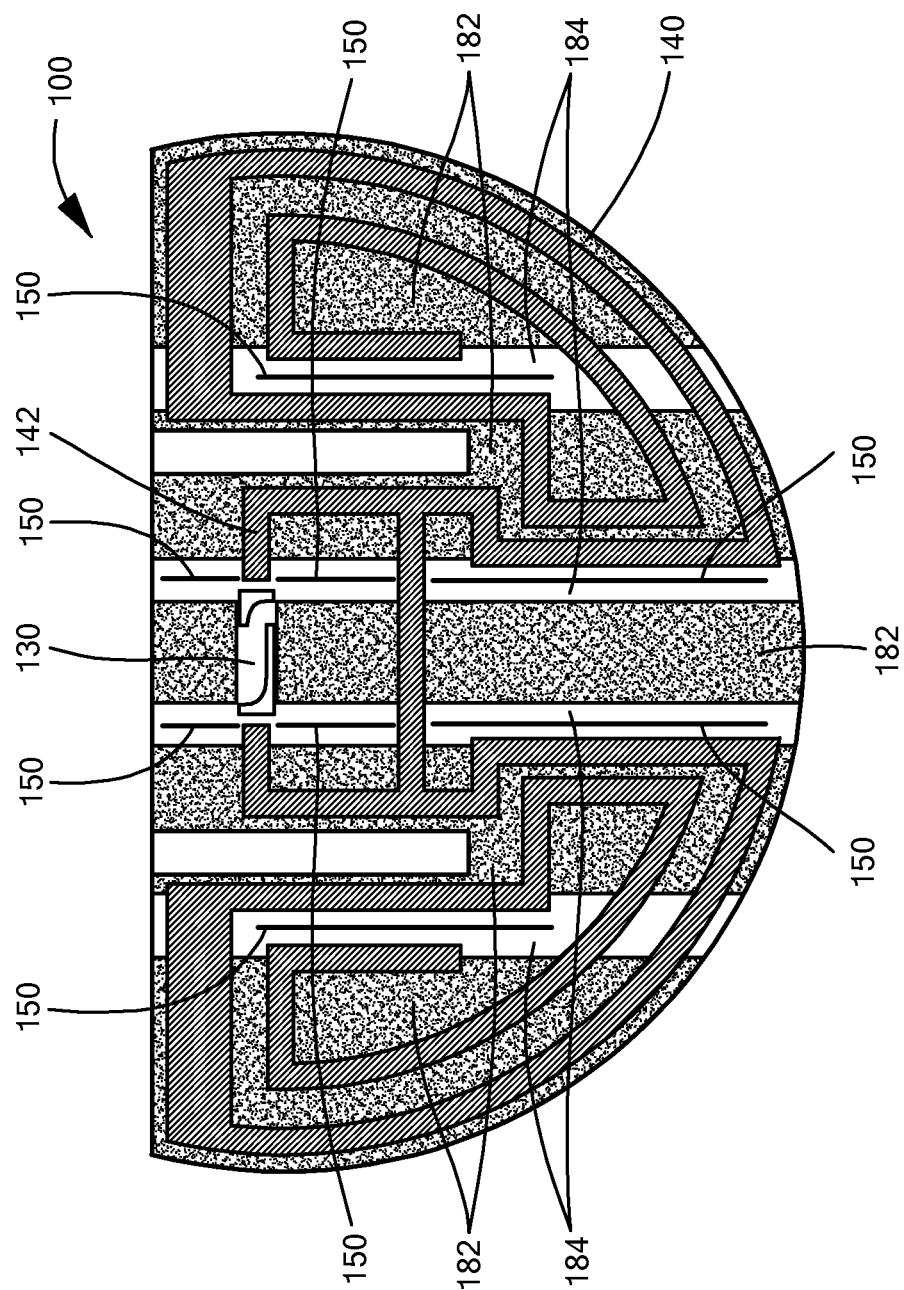
FIG. 3A is a schematic view of the RFID tag shown in FIG. 1 in accordance with exemplary embodiments of the present invention.
Figure 3B:
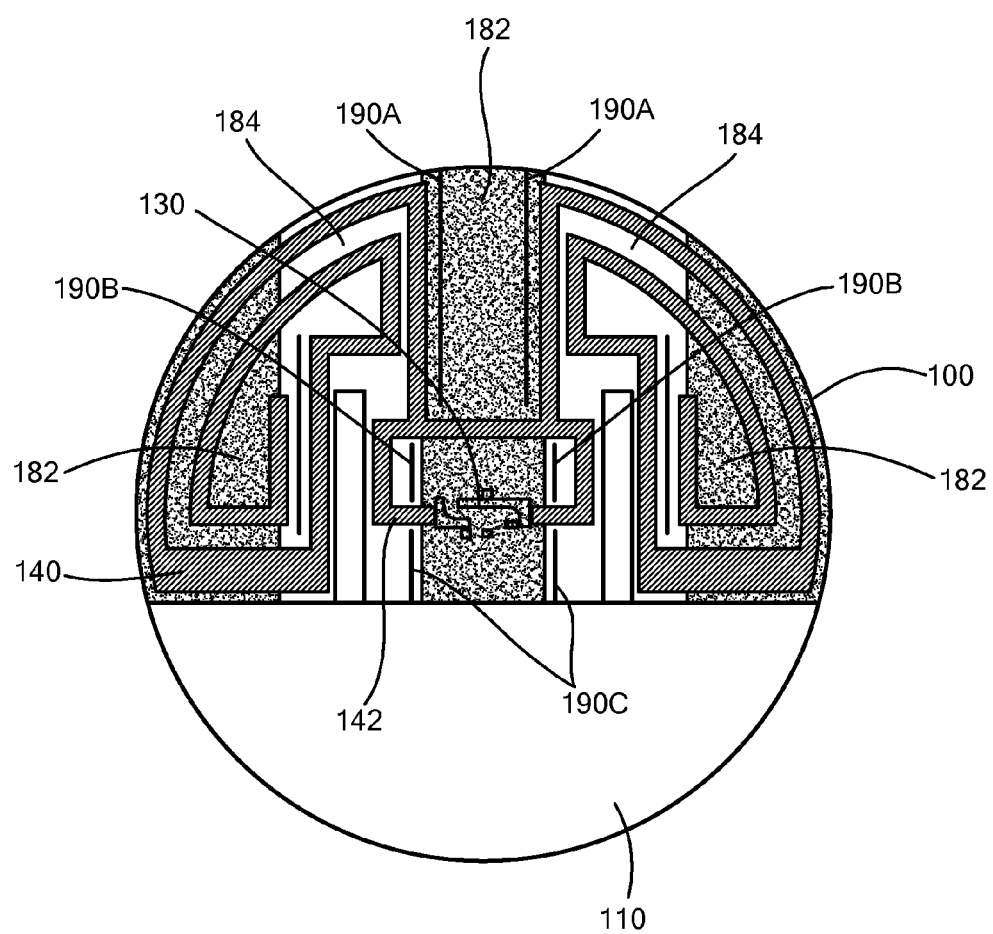
FIG. 3B is a schematic view of the RFID tag shown in FIG. 1 in accordance with alternative embodiments of the present invention.

In order to ensure destruction of the RFID tag 100 during removal, it is preferable to locate the weakened areas 150 in areas that will cause the tear to propagate across the antenna 140 and/or the RFID chip 130. For example, as best shown in FIGS. 3A and 3B, the weakened areas 150 may be located within/between the various sections of the antenna 140. Additionally, one of the weakened areas 150 may be formed within the main loop 142 of the antenna 140 (e.g., the rectangular area of the antenna 140 extending out from and partially encircling the RFID chip 130). It is also important to note that the weakened areas 150 can extend below the antenna 140 (e.g., such that the portion of the substrate 125 directly below the antenna is weakened) or the weakened areas 150 can stop just prior to the antenna 140 and continue on the other side of the antenna 140 (e.g., such that the portion of the substrate 125 directly below the antenna 140 is not weakened/cut but the portion of the substrate 125 on either side of the antenna 140 is weakened/cut).

The cuts/perforations may be formed in/introduced into the substrate 125 in a number of ways. For example, the cuts/perforations may be stamped into the substrate 125 using a die cut process and/or they may be made using a laser cutting, photo-etching, water-jet cutting, or a more traditional cutting process using a sharp edge. Additionally or alternatively, depending upon the material used for the substrate 125, the cuts/perforations may be molded directly into the substrate 125 when the substrate 125 is formed. It is also important to note that the weakened areas 150 (e.g., the cuts/perforations) may also include an arrow head to enhance the tear initiation properties of the weakened area 150. Furthermore, the cuts need not extend through the entire thickness of the substrate 125. For example, the cuts may only partially extend through (e.g., 70-95% through) the thickness of the substrate 125.

In order to protect the RFID chip 130 and antenna 140 from dust, moisture, and other contamination that may negatively impact the performance of the RFID tag 100, the RFID tag 100 may also include a top layer 160 that is secured to the device layer 120 via a layer of adhesive 170. The top layer 160 may be any number of polymers, for example, polypropylene (e.g., a polypropylene film), and, in some embodiments, may be opaque so that the RFID chip 130, the antenna 140 and/or the weakened areas 150 are not visible through the top layer 160. It is also important to note that the material (and the thickness of that material) chosen for the top layer 160 should not be strong enough to support the tensile load during attempted removal of the RFID tag 100 and prevent the underlying substrate 125 from tearing.

It is also important to note that the top layer 160 can provide control over the electromagnetic UHF performance characteristics of the tag 100. For example, the antenna 140, the top layer 160 and the substrate 125 of the RFID tag 100 essentially form a capacitor. Furthermore, the capacitance of the RFID tag 100 impacts the timing of the resistor-capacitor (RC) circuit that, in turn, is a characteristic of the UHF operation of the RFID tag 100 (e.g., the natural frequency of operation of the RFID tag 100). The top layer 160 helps prevent the build-up of condensation (liquid or frost) on the antenna 140. This build-up of condensation can cause the capacitance to shift and negatively impact the performance of the RFIG tag 100 (e.g., the build-up of condensation can decrease the distance at which the RFID tag 100 can be read). Therefore, by controlling the properties of the top layer 140 (e.g., an insulating layer in contact with the antenna 140), some embodiments of the present invention are able to prevent/limit condensation build-up, provide a repeatable capacitance and RC circuit, and improve the performance of the RFID tag 100.

Figure 4:
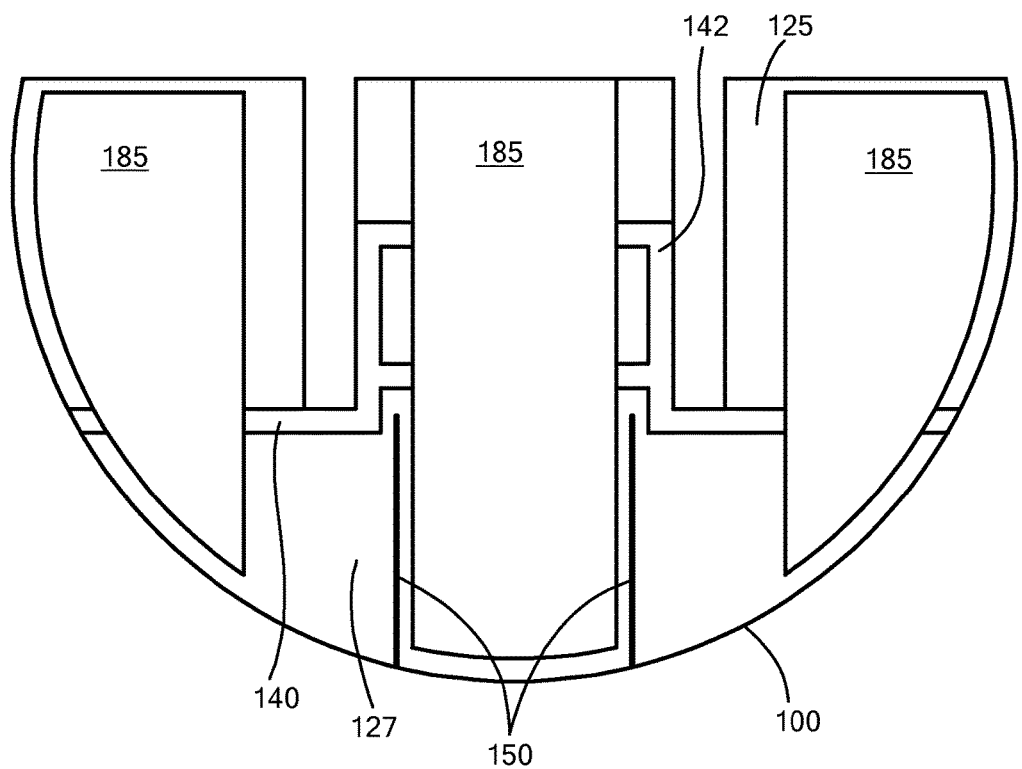
FIG. 4 is an exemplary underside view of the RFID tag shown in FIG. 1 in accordance with various embodiments of the present invention.

As mentioned above, the RFID tag 100 can be secured to an object 110. To that end, the RFID tag 100 can also include a second layer of adhesive 180 on the underside 127 of the substrate 125. This second layer of adhesive 180 may be used to secure the RFID tag 100 to the object 110. As shown in FIG. 4, the RFID tag 100 may include a release liner 185 that covers and protects the adhesive layer 180 prior to the tag 100 being secured to an object 110. When the tag 100 is to be secured to an object 110, the user may simply remove the release liner 185 to expose the adhesive layer 180 and stick the RFID tag 100 to the object 110.

In some embodiments, the second adhesive layer 180 may include a stronger adhesive than that of the first adhesive layer 170 used to secure the top layer 160 to the substrate 125. For example, the first adhesive layer 170 may be a layer of standard glue (e.g., Fasson® S333 adhesive by Avery-Dennison), and the second adhesive layer 180 may be a layer of high bond adhesive, for example, Very High Bond Adhesive (VHB™) from 3M™. By utilizing a high bond adhesive to secure the RFID tag 100 to the object 110, some embodiments require a strong force to remove the RFID tag 100 from the object 110. As discussed in greater detail below, this, in turn, helps to ensure destruction of the tag 100 upon removal.

Figure 2:
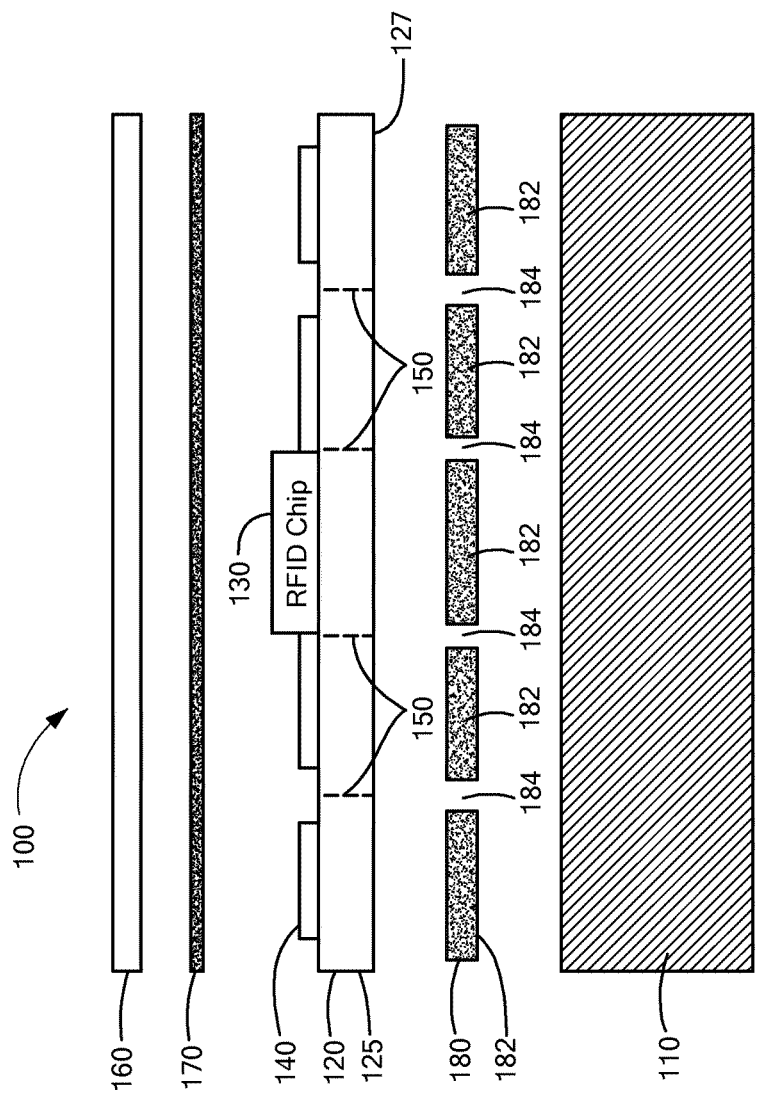
FIG. 2 is a schematic cross-sectional side view of an RFID tag in accordance with various embodiments of the present invention.

As shown in FIGS. 2-4, in some embodiments, the second adhesive layer 180 may be discontinuous such that adhesive is only located in certain areas (adhesive areas 182) of the underside 127 of the substrate 125, and there are spaces/gaps 184 between the adhesive areas 182. For example, in some embodiments, the adhesive may only be present in areas in which the weakened areas 150 are not present. In other words, the adhesive may be located below the non-weakened areas, leaving the spaces/gaps 184 below the weakened areas 150. As discussed in greater detail below, in this configuration, the high bond adhesive areas 182 do not act to strengthen the weakened areas 150, and the spaces/gaps 184 concentrate the tensile force required to remove the label (e.g., the force required to overcome the strength of the adhesive areas securing the RFID tag 100 to the object 110) on the weakened areas 150.

Although FIG. 3A shows all of the weakened areas 150 located within the spaces/gaps 184 in the adhesive layer 180, due to the tolerances and variations that occur when applying the adhesive layer 180, it may be difficult to achieve this configuration for every tag. To that end, some of the weakened areas 150 may be staggered to ensure that at least one of the weakened areas 150 is located within a space/gap 184. For example, as shown in FIG. 3B, the weakened areas 190A/B/C near the loop 142 of the antenna 140 may be staggered such that some of the weakened areas 190A are located closer to the center line of the RFID tag 100 and other weakened areas 190B/C are located slightly more outward from the center line. This staggering ensures that at least one of the weakened areas (e.g., weakened areas 190B/C) near the antenna loop 142 is located within a space/gap 184 in the adhesive layer 180, and accommodates for the manufacturing tolerances for adhesive placement (e.g., the adhesive areas 180) and cutting of the weakened areas 150.

Figure 5:
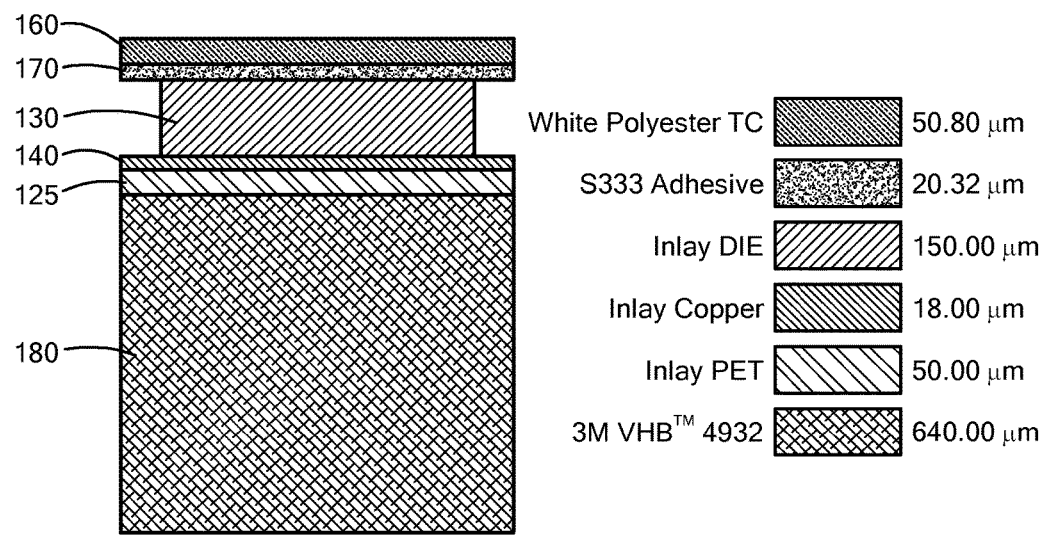
FIG. 5 schematically shows the relative thicknesses of the various layers of the RFID tag shown in FIG. 1 in accordance with illustrative embodiments of the present invention.

Although the types and thicknesses of the materials used in the RFID tag 100 can vary depending upon the application (e.g., the type and material of the object to which the RFID tag 100 will be secured, the ambient temperature and conditions at which the object will be stored, etc.), in some embodiments, the thickness of the second adhesive layer 170 may be greater than the thicknesses of the other layers of the RFID tag 100 (see FIG. 5). For example, the top layer 160 can be approximately 50 microns (e.g., 40-60 microns) thick, the first adhesive layer 170 may be approximately 20 microns (15-25 microns) thick, the inlay die (e.g., the RFID chip 130) may be approximately 150 microns (125-175 microns) thick, the inlay copper (e.g., the antenna 140) may be approximately 18 microns (14-22 microns) thick, the substrate 125 may be approximately 50 microns (40-50 microns) thick, and the second adhesive layer 180 may be approximately 640 microns (600-700 microns) thick.

Figure 6:
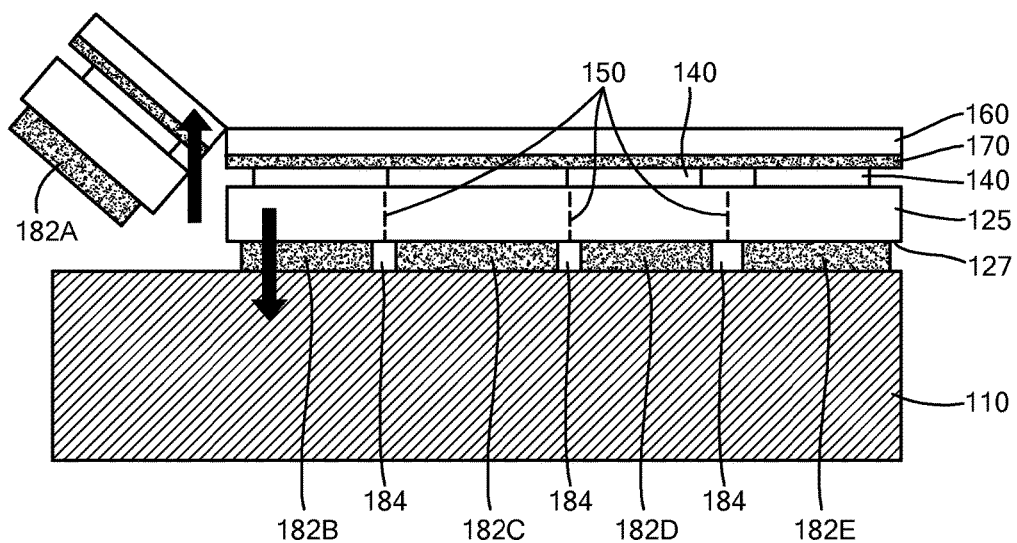
FIG. 6 is a schematic cross-sectional side view of the RFID tag shown in FIG. 1 during tampering and/or attempted removal from an object, in accordance with various embodiments of the present invention.

As mentioned above and as schematically shown in FIG. 6, the weakened areas 150 (e.g., in conjunction with the configuration of the second adhesive layer 180) ensure that the RFID tag 100 is destroyed if an individual attempts to remove the tag 100 from the object. For example, as an individual begins to tamper with the RFID tag 100 and begins to pull the tag 100, the first adhesive area 182A will begin fail and separate from the surface of the object 110. Once this first adhesive area 182A has completely separated from the object 110, the tensile load from pulling the tag 100 will be concentrated on the portion of the substrate between the first adhesive area 182A and the second adhesive area 182B. Furthermore, because the weakened areas 150 reduce the tensile load required to tear the substrate 125 and the load required to separate the adjacent adhesive area 182B is greater than the load that the weakened area 150 can support, the applied tensile load will tear the substrate 125 at the weakened area 150.

It is also important to note that, like the weakened areas 150 in the substrate 125, the antenna 140, first adhesive layer 170 and the top layer 160 cannot support the tensile load required to separate the adjacent adhesive area 182B from the object 110. Therefore, the tear will propagate through the antenna 140 (and any similar conductive or semi-conductive material), the first adhesive layer 170 and the top layer 160. This, in turn, will sever the electrical connection and render the RFID tag 100 inoperable.

Figure 7:
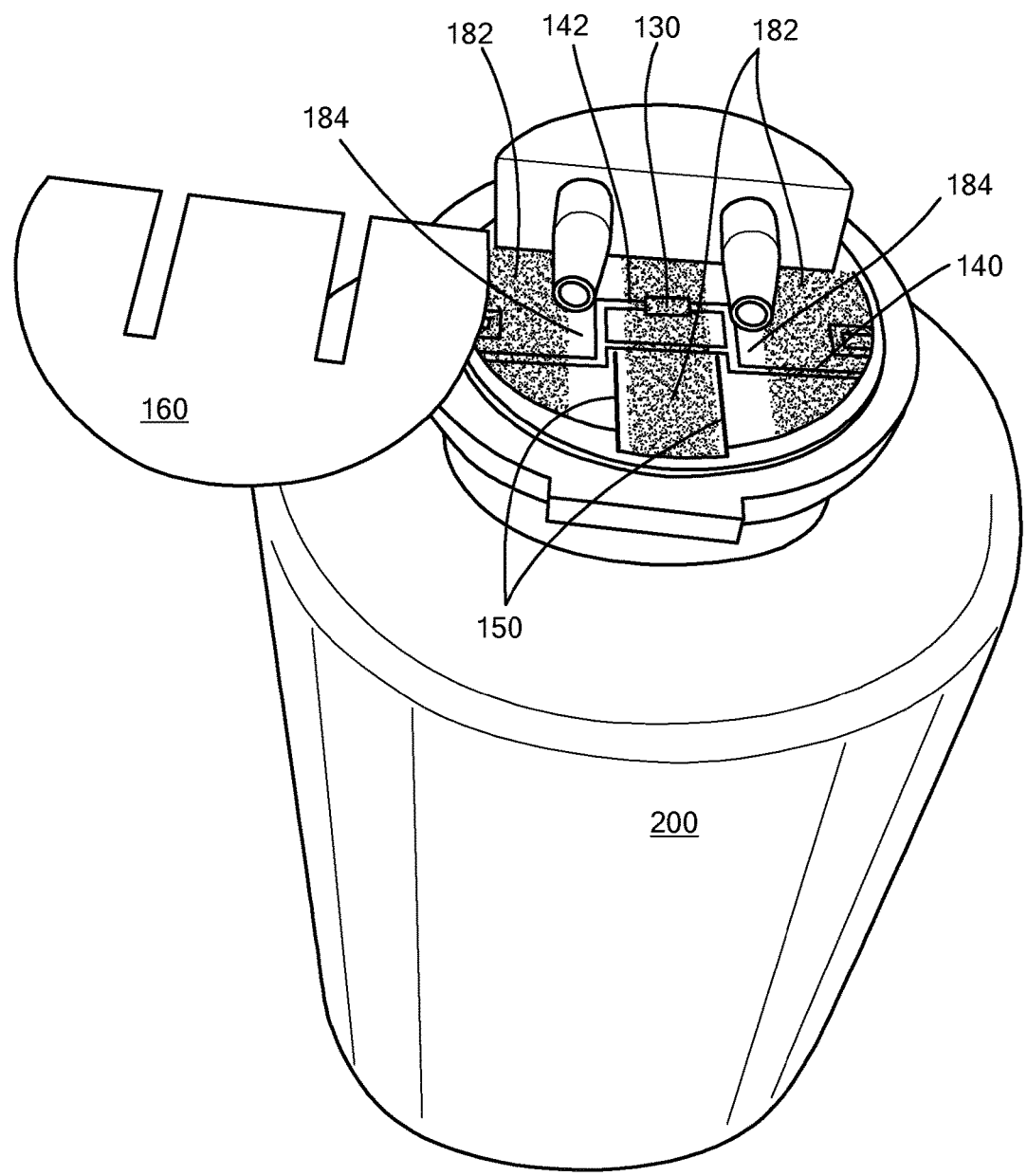
FIG. 7 schematically shows an RFID tag without the top layer and secured to an object in accordance with illustrative embodiments of the present invention.

FIGS. 7-8, 9A and 9B show an RFID tag 100 being secured to an object (e.g., a plasma storage bottle 200), and subsequently someone attempting to remove the RFID tag 100 from the bottle 200. As shown in FIG. 7, in some embodiments, the device layer 120 (e.g., the substrate 125, antenna 140, and RFID chip 130) may be secured to the bottle 200 via the second adhesive layer 180 (e.g., the layer of VHB adhesive), without the top layer 160 and the first adhesive layer 170. As discussed above, the substrate 125 may have a number of weakened areas 150 (e.g., cuts, perforations, etc.), and the second adhesive layer 180 may have a number of adhesive areas 182 with spaces/gaps 184 (e.g., areas without adhesive) between the adhesive areas 182. These spaces/gaps 184 may be located under the weakened areas 150 in the substrate 125.

Figure 8:
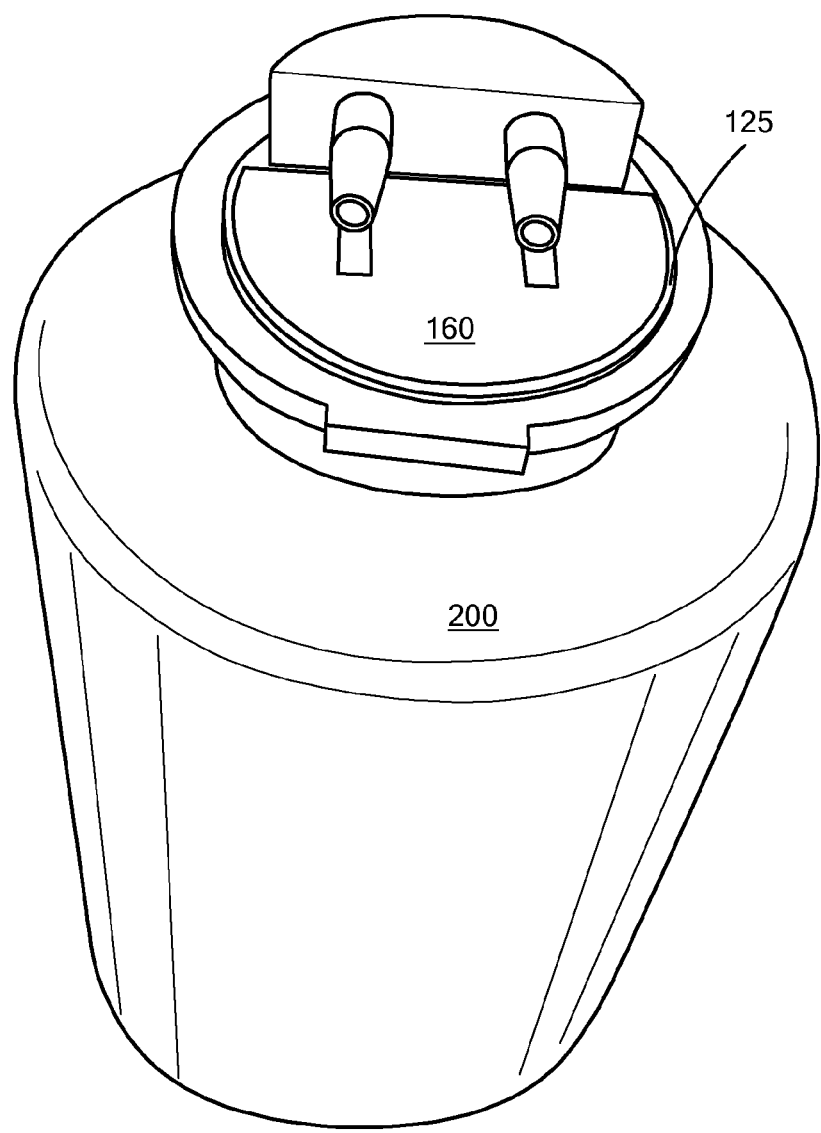
FIG. 8 schematically shows the RFID tag in FIG. 7 secured to an object with the top layer secured to the RFID tag in accordance with illustrative embodiments of the present invention.

Once the device layer 120 is secured to the bottle 200, the user may then remove a release layer from the underside of the first adhesive layer 170 and secure the top layer 160 to the substrate 125 via the first adhesive layer 170 (FIG. 8). As mentioned above, the top layer 160 may be opaque so that the weakened areas 150 are not visible to someone attempting to remove the RFID tag 100 from the bottle 200. It is also important to note that, although FIGS. 7 and 8 show the top layer 160 being secured to the substrate 125 after the device layer 120 is attached to the bottle, the top layer 160 may be part of the construct and may be secured to the device layer 120 prior to the device layer 120 being secured to the bottle 200 (e.g., during manufacturing of the RFID tag 100).

Figure 9B:
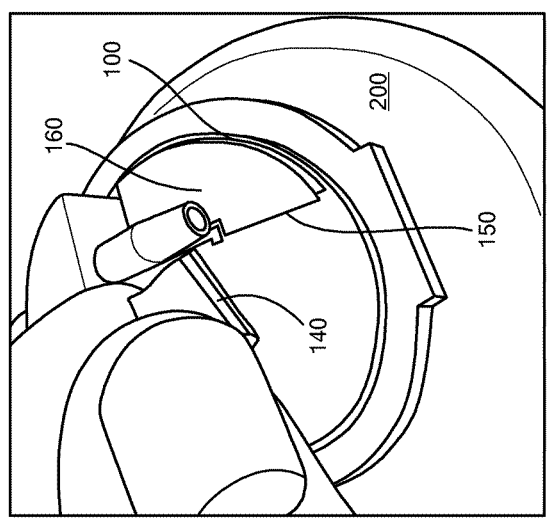
FIGS. 9A and 9B schematically show the RFID tag of FIGS. 7 and 8 being destroyed during attempted removal from the object, in accordance with illustrative embodiments of the present invention.
Figure 9A:
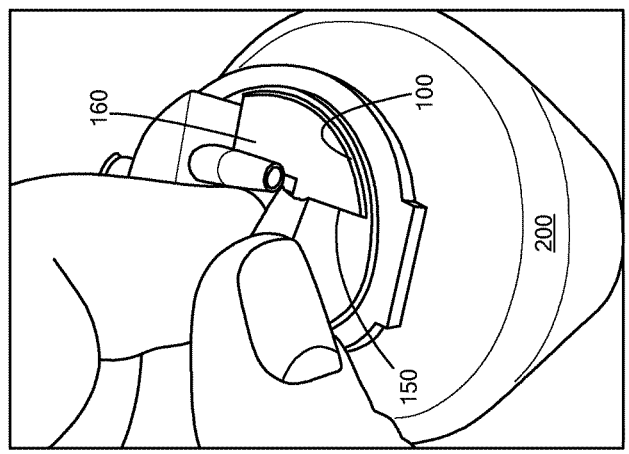

FIGS. 9A and 9B show an individual attempting to remove the RFID tag 100 from the bottle 200. In particular, as the individual applies sufficient force to overcome the strength of the second adhesive layer 180 (e.g., the VHB adhesive layer), a portion of the RFID tag 100 will begin to lift off of the bottle 200. However, as the individual continues to pull on the RFID tag 100 and a portion of the second adhesive layer 180 (e.g., the first adhesive area 182) has fully detached from the bottle 200, the force applied to the tag 100 will be transferred to the substrate 125 which is still secured to the bottle 200 via the rest of the second adhesive layer 180 (e.g., the other adhesive areas 182B-E). Furthermore, because the force required to detach the remaining adhesive areas 182 (e.g., areas 182B-E) from the bottle 200 is greater than the force required to tear the substrate 125 (particularly at the weakened areas 150), the RFID tag 100 will begin to tear (FIG. 9A). As the individual continues to pull the tag 100, the tear will continue to propagate through the layers of the tag 100 (e.g., the substrate 125, antenna 140, first adhesive layer 170, top layer 160, and perhaps the RFID chip 130), destroying the RFID tag 100 (FIG. 9B). The top layer 160 may be opaque to prevent the individual from observing the impending failure of the substrate 125 and adjusting their tampering techniques to prevent it.

Although the figures discussed above show an RFID tag 100 having a generally semi-circular shape, it is important to note that other embodiments of the present invention may have a different shape and configuration. For example, as shown in FIGS. 10A-10E, the RFID tag 100 may have a square (FIG. 10A) or rectangular shape (FIGS. 10B-10E). Additionally, it should be noted that these shapes are merely examples and the RFID tag can be any shape (e.g., circular, triangular, etc.).

Figure 10A:
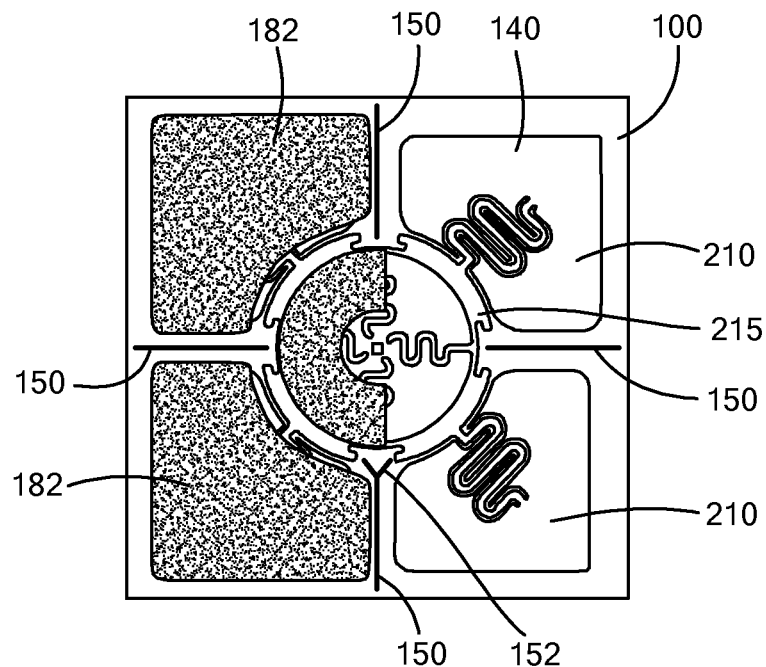
FIGS. 10A-10E schematically show various alternative configurations of an RFID tag in accordance with additional embodiments of the present invention.
Figure 10B:
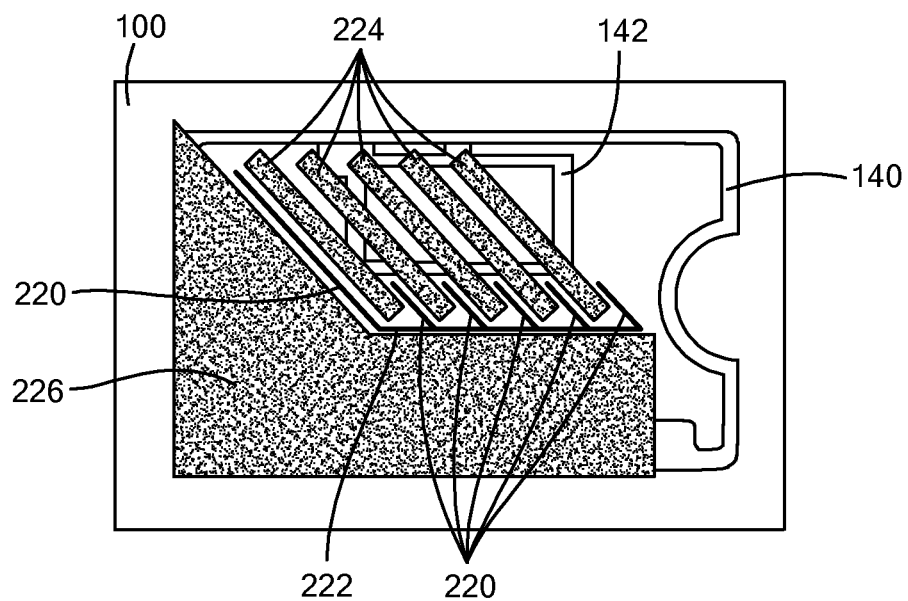

Furthermore, the configuration and layout of the weakened areas 150 and the adhesive areas 182 may be dependent upon then design of the antenna 140. For example, as shown in FIG. 10A, the antenna 140 can have several leafs 210 that extend outwardly from a central ring 215. In such embodiments, the weakened areas 140 may be located between the leafs 210 and extend between the central ring 215 and the edge of the RFID tag 100. The weakened areas may also have an arrow head 152 or similar structure to enhance the tear initiation properties of the weakened area 150. Additionally, the adhesive areas 182 may be located on the underside of the substrate 125 beneath each of the leafs 210 and within the interior of the ring 215. It is important to note that FIGS. 10A-10E do not show the adhesive areas 182 on half of the RFID tag 100 so that the antenna 140 is visible.

Alternatively, if the antenna 140 is rectangular in shape with an open interior (FIG. 10B), the weakened areas may be within the interior of the rectangular antenna 140, and can be a number of angled cuts 220 connected by a horizontal cut 222. In such embodiments, there may be a number of narrow adhesive areas 224 between each of the angled cuts 220 and a large adhesive area 226 to the left and/or right of the angled cuts 222 and below the horizontal cut 224.

Figure 10C:
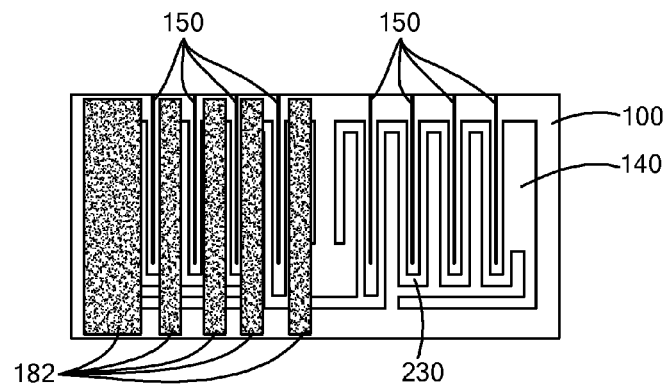
Figure 10D:
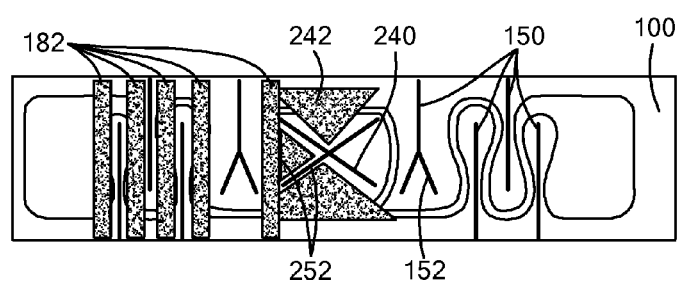
Figure 10E:
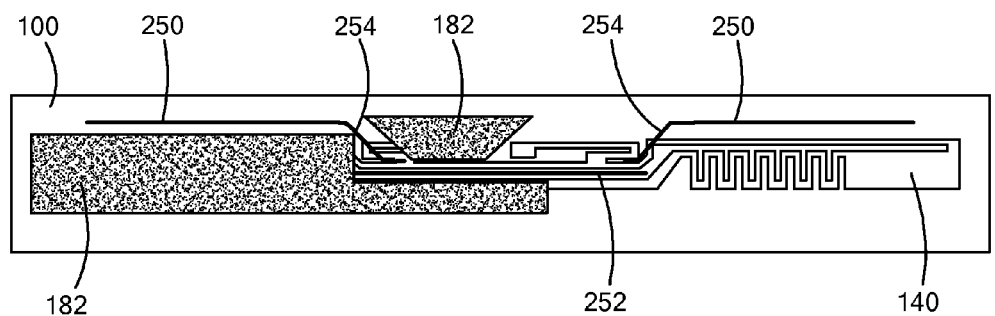

As shown in FIGS. 10C to 10E, in some embodiments, the antenna 140 can have a wave like shape 230. In such embodiments, the weakened areas 150 may be located between each of the individual "waves" of the antenna 150, and the adhesive areas 182 may be located beneath the "waves." Additionally, as shown in FIG. 10D, there may be an x-shaped weakened area 240 (e.g., an x-shaped cut) within the main loop 142 of the antenna 140. Furthermore, the adhesive areas 182 may include triangular shaped areas 242 that extend between the arms of the x-shaped weakened area 240. Additionally or alternatively, the RFID tag may have one or more weakened areas extending along the length of the antenna (e.g., weakened areas 250), one or more weakened areas extending within the antenna (e.g., weakened area 252) and one or more weakened areas 254 connecting weakened areas 250 and 252.

It is important to note that, although the above described embodiments utilize an adhesive (e.g., a very high bond adhesive) to secure the RFID tag 100 to the container 110, other embodiments can utilize other mechanical and/or chemical bonding techniques to secure the RFID tag 100 to the container 110. For example, some embodiments can solvent bond, ultrasonically weld, or laser weld the RFID tag 100 to the container (or the top layer 160 to the substrate). In such embodiments, the RFID tag 100 may only be welded to the container 110 in certain areas (e.g., in a manner similar to how the second adhesive layer is applied only in certain areas) to create un-welded areas located beneath the weakened areas 150 and ensure that the tensile load required to remove the RFID tag 100 from the container is greater than the load that the weakened areas 150 can handle (e.g., so that the substrate 125 tears during removal).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A frangible radio frequency identification (RFID) tag comprising:
    a substrate having at least one weakened area;
    an RFID chip located on the substrate;
    an antenna located on the substrate and electrically connected to the RFID chip;
    a plurality of adhesive areas applied to an underside of the substrate and configured to allow the RFID tag to be secured to an object, the plurality of adhesive areas spaced from one another, thereby forming at least one gap between the plurality of adhesive areas, the at least one gap being located under the at least one weakened area; and
    a top layer located on and covering the substrate, RFID chip and antenna, the top layer being a solid layer of material and having a tensile strength below the tensile strength required to remove the RFID tag from the object such that the top layer is configured to tear upon an attempted removal of the RFID tag from the object, wherein the top layer is unperforated or uncut.

2. A frangible RFID tag according to claim 1, further comprising:
    a first release liner located below the plurality of adhesive areas and configured to be removed from the plurality of adhesive areas prior to securing the RFID tag to the object.

3. A frangible RFID tag according to claim 1, further comprising:

an adhesive layer located above the substrate, the top layer secured to the substrate via the adhesive layer.

4. A frangible RFID tag according to claim 1, wherein the top layer is opaque.

5. A frangible RFID tag according to claim 1, wherein the top layer is a thin polymer layer.

6. A frangible RFID tag according to claim 1, wherein the top layer protects the RFID chip from dust and moisture.

7. A frangible RFID tag according to claim 1, wherein the plurality of adhesive areas are areas of high bond adhesive.

8. A frangible RFID tag according to claim 1, wherein the weakened areas are cuts formed within the substrate.

9. A frangible RFID tag according to claim 8, wherein the cuts are die-cuts.

10. A frangible RFID tag according to claim 1, wherein the weakened areas extend below the antenna.

11. A frangible RFID tag according to claim 1, wherein the antenna includes a loop, one of the at least one weakened area being within the loop.

12. A frangible RFID tag according to claim 1, wherein the weakened areas are configured to cause destruction of the RFID tag upon removal of the RFID tag from the object.

13. A frangible RFID tag according to claim 12, wherein destruction of the RFID tag includes tearing of the antenna.

14. A frangible RFID tag according to claim 1, wherein the top layer is uniform.

15. A blood component storage container comprising:
a body defining an interior volume for storing a blood component; and
a frangible radio frequency identification (RFID) tag secured to a surface of the storage container, the RFID tag comprising:
a substrate having at least one weakened area;
an RFID chip located on the substrate;
an antenna located on the substrate and electrically connected to the RFID chip,
a plurality of adhesive areas applied to an underside of the substrate and configured to allow the RFID tag to be secured to the blood component storage container, the plurality of adhesive areas spaced from one another, thereby forming at least one gap between the plurality of adhesive areas, the at least one gap being located under the at least one weakened area, and
a top layer located on and covering the substrate, RFID chip and antenna, the top layer being a solid layer of material and having a tensile strength below the tensile strength required to remove the RFID tag from the object such that the top layer is configured to tear upon an attempted removal of the RFID tag from the object, wherein the top layer is unperforated or uncut.

16. A blood component storage container according to claim 15, wherein the frangible RFID tag further includes:
a first release liner located below the plurality of adhesive areas and configured to be removed from the plurality of adhesive areas prior to securing the RFID tag to the blood storage container.

17. A blood component storage container according to claim 15, wherein the frangible RFID tag further includes:
an adhesive layer located above the substrate, the top layer secured to the substate via the adhesive layer.

18. A blood component storage container according to claim 15, wherein the top layer is opaque.

19. A blood component storage container according to claim 15, wherein the top layer is a thin polymer layer.

20. A blood component storage container according to claim 15, wherein the top layer protects the RFID chip from dust and moisture.

21. A blood component storage container according to claim 15, wherein the plurality of adhesive areas are areas of high bond adhesive.

22. A blood component storage container according to claim 15, wherein the weakened areas are cuts formed within the substrate.

23. A blood component storage container according to claim 22, wherein the cuts are die-cuts.

24. A blood component storage container according to claim 15, wherein the weakened areas extend below the antenna.

25. A blood component storage container according to claim 15, wherein the antenna includes a loop, one of the at least one weakened area being within the loop.

26. A blood component storage container according to claim 15, wherein the weakened areas are configured to cause destruction of the RFID tag upon removal of the RFID tag from the blood component storage container.

27. A blood component storage container according to claim 26, wherein destruction of the RFID tag includes tearing of the antenna.

28. A method of producing a frangible radio frequency identification (RFID) tag comprising:
providing a device layer having a substrate and an antenna and an RFID chip located on the substrate;
forming at least one weakened area within the substrate;
applying a plurality of adhesive areas to an underside of the substrate, the plurality of adhesive areas configured to allow the RFID tag to be secured to an object and being spaced from one another, thereby forming at least one gap between the plurality of adhesive areas, the at least one gap being located under the at least one weakened area; and
applying a top layer to a top surface of the device layer, the top layer covering the device layer, antenna and RFID chip, the top layer being a solid layer of material and having a tensile strength below the tensile strength required to remove the RFID tag from the object such that the top layer is configured to tear upon an attempted removal of the RFID tag from the object, wherein the top layer is unperforated or uncut.

29. A method according to claim 28, further comprising:
applying a first release liner to the plurality of adhesive areas, the first release liner configured to be removed from the plurality of adhesive areas prior to securing the RFID tag to an object.

30. A method according to claim 28, wherein the top layer includes an adhesive layer, the adhesive layer securing the top layer to the device layer.

31. A method according to claim 28, wherein the top layer is opaque.

32. A method according to claim 28, wherein the top layer is a thin polymer layer.

33. A method according to claim 28, wherein the plurality of adhesive areas are areas of high bond adhesive.

34. A method according to claim 28, wherein forming the at least one weakened area within the substrate includes cutting the substrate.

35. A method according to claim 28, wherein forming the at least one weakened area within the substrate includes die-cutting the substrate.

36. A method according to claim 28, wherein the weakened areas extend below the antenna.

37. A method according to claim 28, wherein the antenna includes a loop, one of the at least one weakened area being within the loop.

38. A method according to claim 28, wherein the at least one weakened area is configured to cause destruction of the RFID tag upon removal of the RFID tag from the object.

39. A method according to claim 38, wherein destruction of the RFID tag includes tearing of the antenna.

40. A frangible radio frequency identification (RFID) tag comprising:
   a substrate having at least one weakened area;
   an RFID chip located on the substrate;
   an antenna located on the substrate and electrically connected to the RFID chip;
   a plurality of securement areas located on an underside of the substrate and configured to allow the RFID tag to be secured to an object, the plurality of securement areas spaced from one another, thereby forming at least one gap between the plurality of securement areas, the at least one gap being located under the at least one weakened area; and
   a top layer located on and covering the substrate, RFID chip and antenna, the top layer being a solid layer of material and having a tensile strength below the tensile strength required to remove the RFID tag from the object such that the top layer is configured to tear upon an attempted removal of the RFID tag from the object, wherein the top layer is unperforated or uncut.

41. A frangible RFID tag according to claim 40, wherein the plurality of securement areas are configured to be chemically bonded to the surface to the object.

42. A frangible RFID tag according to claim 41, wherein the at least one gap is an un-bonded area between the bonded areas.

43. A frangible RFID tag according to claim 40, wherein the plurality of securement areas are configured to be thermally bonded to the surface to the object.

44. A frangible RFID tag according to claim 43, wherein the at least one gap is an un-bonded area between the bonded areas.

* * * * *

UNITED STATES PATENT AND TRADEMARK OFFICE
CERTIFICATE OF CORRECTION

PATENT NO. : 9,626,620 B2
APPLICATION NO. : 14/894235
DATED : April 18, 2017
INVENTOR(S) : Christopher S. McDowell Page 1 of 1

It is certified that error appears in the above-identified patent and that said Letters Patent is hereby corrected as shown below:

In the Claims

In Column 9, Line 62:
Replace "substate"
With "substrate"

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*